(12) United States Patent
Wang

(10) Patent No.: US 9,457,945 B1
(45) Date of Patent: Oct. 4, 2016

(54) MULTIPLE WATER CONTAINERS AND HOLDER STRUCTURE

(71) Applicant: Hsiao-Chin Wang, Taipei (TW)

(72) Inventor: Hsiao-Chin Wang, Taipei (TW)

( * ) Notice: Subject to any disclaimer, the term of this patent is extended or adjusted under 35 U.S.C. 154(b) by 0 days.

(21) Appl. No.: 14/754,945

(22) Filed: Jun. 30, 2015

(51) Int. Cl.
*B65D 71/70* (2006.01)
*B65D 71/00* (2006.01)
*B65D 85/72* (2006.01)

(52) U.S. Cl.
CPC .......... *B65D 71/70* (2013.01); *B65D 71/0085* (2013.01); *B65D 85/72* (2013.01)

(58) Field of Classification Search
CPC .......... B65D 2313/04; B65D 2313/06; B65D 2313/03; B65D 23/001
USPC .......... 206/806, 823, 818, 229, 298
See application file for complete search history.

(56) References Cited

U.S. PATENT DOCUMENTS

| | | | | |
|---|---|---|---|---|
| 3,013,688 A * | 12/1961 | Luning | ................ | A47G 23/03 215/376 |
| 3,123,935 A * | 3/1964 | Williams | ................ | A47B 13/16 108/116 |
| 4,696,447 A * | 9/1987 | Strecker | ................ | A45D 20/12 248/206.3 |
| 5,435,511 A * | 7/1995 | Hsu | ................ | A01K 63/006 248/206.3 |
| 6,637,707 B1 * | 10/2003 | Gates | ................ | A47B 81/005 211/64 |
| 8,544,695 B2 * | 10/2013 | Gordon | ................ | A47K 5/122 222/180 |
| 2014/0069935 A1 * | 3/2014 | James, Jr. | ................ | B65D 81/3813 220/592.2 |
| 2015/0068995 A1 * | 3/2015 | Hartman | ................ | A45D 29/18 211/85.18 |

* cited by examiner

*Primary Examiner* — Anthony Stashick
*Assistant Examiner* — Blaine Neway
(74) *Attorney, Agent, or Firm* — Alan D. Kamrath; Kamrath IP Lawfirm, P.A.

(57) ABSTRACT

A multiple water containers and holder structure includes a holder having a bent portion provided at its one side to form an open receiving space between the holder and the bent portion and a plurality of combining portions defined on a side of the holder closer to the receiving space; a securing element combined on the bent portion including at least one attachment element on a side surface of the securing element away from the holder for attaching the securing element onto an intended vertical face; and a plurality of coupling sets consisting of a plurality of first coupling elements provided at locations on the holder corresponding to the respective combining portions and a plurality of second coupling elements provided on the bottoms of the container bodies. The first coupling elements and the second coupling elements normally maintain connection with each other, so that the container bodies are stored and held in place in the receiving space of the holder.

5 Claims, 6 Drawing Sheets

MULTIPLE WATER CONTAINERS AND HOLDER STRUCTURE

BACKGROUND OF THE INVENTION

1. Field of the Invention

The invention relates to a multiple water containers and holder structure, and more particularly, to a multiple water containers and holder structure that provides easy assembly and easy storage and enhances application versatility.

2. Description of the Prior Art

A traditional device for storing tumblers and toothbrushes, such as the structure disclosed in titled "Tumbler Holder", may include: a strong suction module that can be attached onto the wall. The suction module has a toothbrush-fitting hole and a lug-fitting hole. The toothbrush-fitting hole allows a toothbrush to be inserted therein for storage. A tumbler includes a lug that can be inserted into the lug-fitting hole so the tumbler can be hanged upside down on the suction module to allow water to be drained. However, as the tumbler is held inside the lug-fitting hole through the lug, the weight of the tumbler itself may tilt the lug, which in turns may cause the tumbler to slip out and fall off. Furthermore, the tumbler is prone to titling upon gentle touch and fails to maintain in a fully inverted position at all time, so complete drainage cannot be ensured. Moreover, the suction module is poor in terms of space utilization as it is only capable of accommodating one toothbrush at a time.

In view of the shortcomings in the conventional tumbler holder structures, the present invention is proposed to provide improvements that address these shortcomings.

SUMMARY OF THE INVENTION

One main objective of the present invention is to provide a multiple water containers and holder structure that provides easy storage of multiple water containers underneath a holder that is secured onto an intended vertical face (wall) through magnetic attraction or adhesion.

Another objective of the present invention is to provide a multiple water containers and holder structure that enhances application versatility by implementing different structural variations through simple subtle changes.

In order to achieve the above objectives and efficacies, the technical means employed by the present invention may include: a holder including a bent portion at one side thereof to form an open receiving space between the holder and the bent portion and a plurality of receiving recesses on a side of the holder away from the receiving space; a securing element combined on the bent portion including at least one attachment element on a side surface of the securing element away from the holder for attaching the securing element onto an intended vertical face; a plurality of container bodies, each including a receiving recess on its bottom; and a plurality of coupling sets consisting of a plurality of first coupling elements provided in the receiving recesses of the holder and a plurality of second coupling elements provided in the receiving recesses on the bottoms of the container bodies, wherein the first coupling elements and the second coupling elements normally maintain connection with each other, so that the container bodies are stored and held in place in the receiving space of the holder.

Based on the above structure, the first and second coupling elements of the coupling sets are magnetic attracted bodies.

Based on the above structure, a plurality of combining portions are provided at one side of the holder closer to the receiving space corresponding to respective receiving recesses, and a container bottom cover is provided on each container body, and a combined portion is provided on each container bottom cover corresponding to a respective combining portion.

Based on the above structure, each combining portion is a convex portion, and each combined portion is a concave portion that fits the combining portion.

Based on the above structure, a concave slot is provided on the bottom of each of the container bodies, and each of the container bottom covers is provided with a rib to be inserted into the respective slot to combine the container bottom over to the bottom of the respective container body.

Based on the above structure, the attachment element is selected from one of a sucker and a double-sided adhesive tape.

Based on the above structure, guiding grooves are provided on both sides of the bent portion of the holder, and side protrusions are provided on both sides of the securing element for sliding into the respective guiding grooves.

The objectives, efficacies and features of the present invention can be more fully understood by referring to the drawing as follows:

DETAILED DESCRIPTION OF THE PREFERRED EMBODIMENTS

Figure 1:
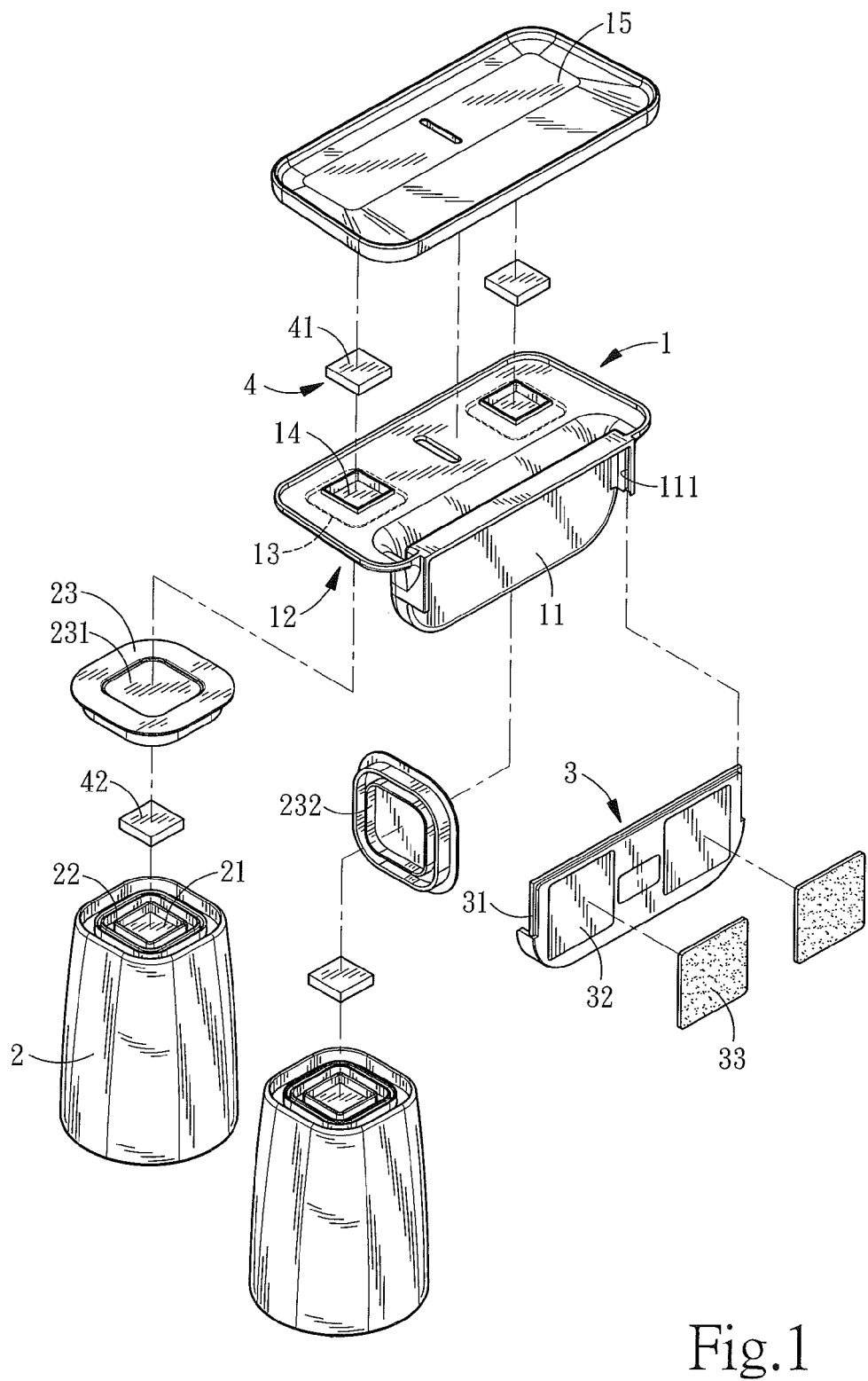
FIG. 1 is an exploded view of a structure in accordance with a first embodiment of the present invention.
Figure 2:
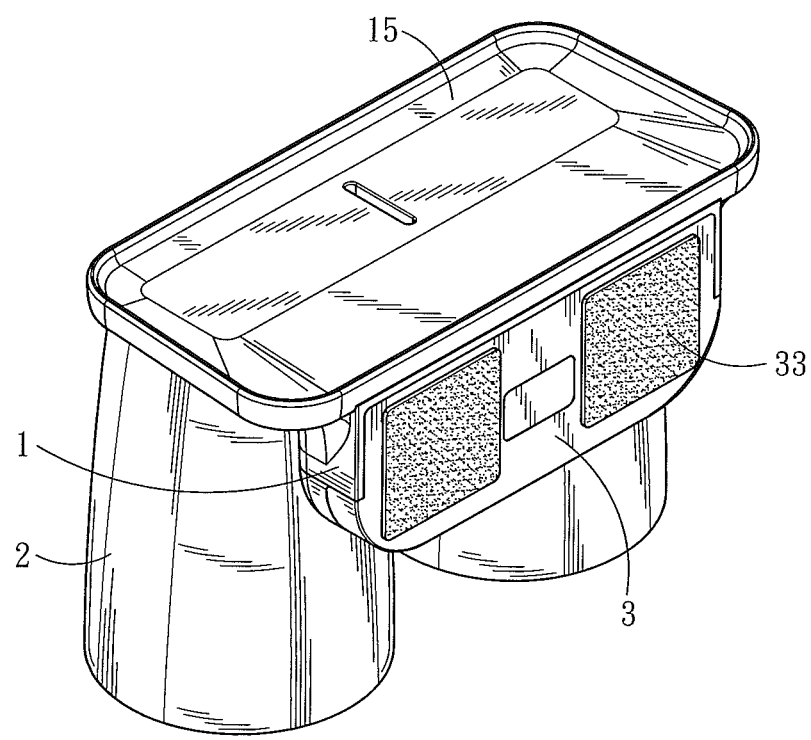
FIG. 2 is a schematic diagram illustrating the overall assembly of the structure in accordance with the first embodiment of the present invention.
Figure 3:
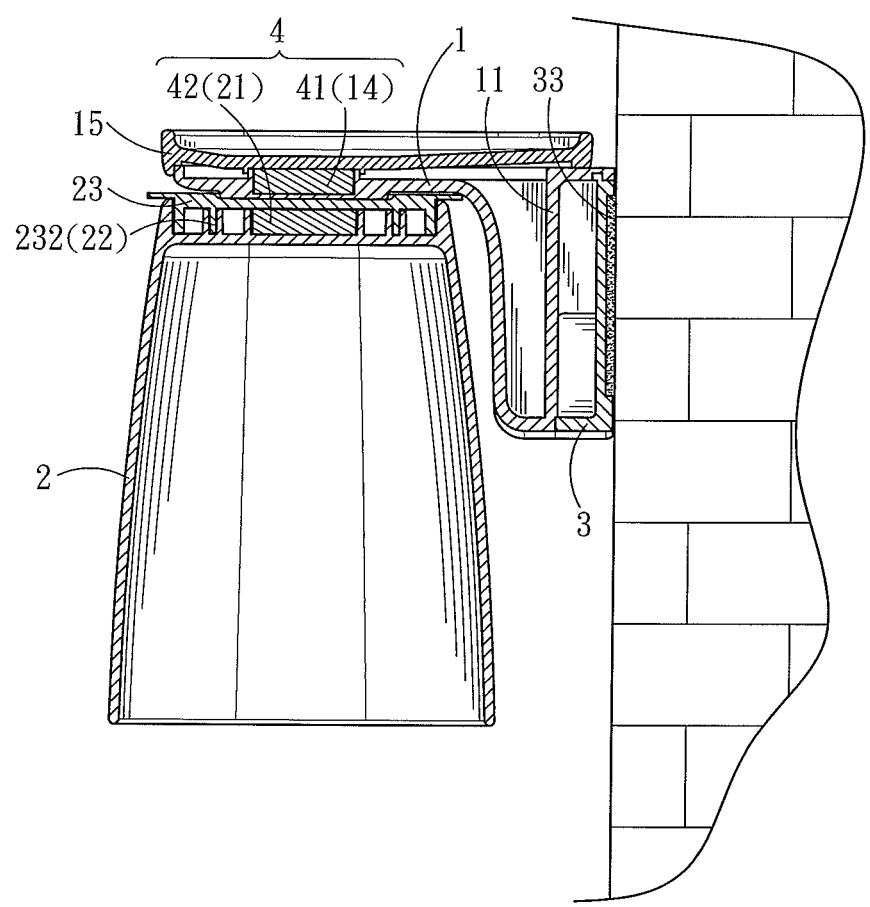
FIG. 3 is a cross-section view of the overall assembly of the structure in accordance with the first embodiment of the present invention.

Referring to FIGS. 1 to 3, a structure in accordance with a first embodiment of the present invention essentially includes: a holder 1, container bodies 2, a securing element 3 and coupling sets 4; wherein a bent portion 11 is provided at one side of the holder 1 so as to form an open receiving space 12 between the holder 1 and the bent portion 11. A plurality of combining portions 13 are defined at one side of the holder 1 closer to the receiving space 12, and a plurality of receiving recesses 14 are provided corresponding to the combining portions 13 at the opposite side of the holder 1. A decorative cover 15 can be placed on top of the side of the holder 1 including the receiving recesses 14. Guiding grooves 111 are provided at both sides of the bent portion 11.

Side protrusions 31 are provided on both sides of the securing element 3 for sliding into the respective guiding grooves 111, such that the securing element 3 can be combined with the bent portion 11. A plurality of securing portions 32 are provided on a side surface of the securing element 3 away from the holder 1. The securing portions 32 can be secured in place on an intended vertical face (e.g. a wall or other types of plane for securing) via at least one attachment element 33. In this embodiment, the attachment element 33 is an double-sided adhesive tape, of which one side surface is adhered to a securing portion 32, and the other side surface is adhered the intended vertical face.

Each of the plurality of container bodies 2 is provided with a receiving recess 21 at its bottom. A concave slot 22 is provided around the periphery of the receiving recess 21. A plurality of container bottom covers 23 are also provided. Each of the container bottom covers 23 is provided with a rib 232 corresponding to the slot 22. By inserting the ribs 232 into the slots 22, the container bottom covers 23 can be combined to the bottoms of the container bodies 2. A combined portion 231 is provided at a side surface of each of the container bottom covers 23 away from the container bodies 2 corresponding to a respective combining portion 13. For example, each combining portion 13 can be a convex portion, and each combined portion 231 can be a concave portion that fits the respective combining portion 13.

The plurality of coupling sets 4 consist of a plurality of first coupling elements 41 provided in the receiving recesses 14 and a plurality of second coupling elements 42 provided in the receiving recesses 21. The first coupling elements 41 and the second coupling elements 42 normally maintain connection with each other. In an implementation, the first coupling elements 41 and the second coupling elements 42 are magnetically attracted bodies, such that the container bodies 2, upon using, can be stored in the receiving space 12 of the holder 1 through magnetic effect.

Figure 4:
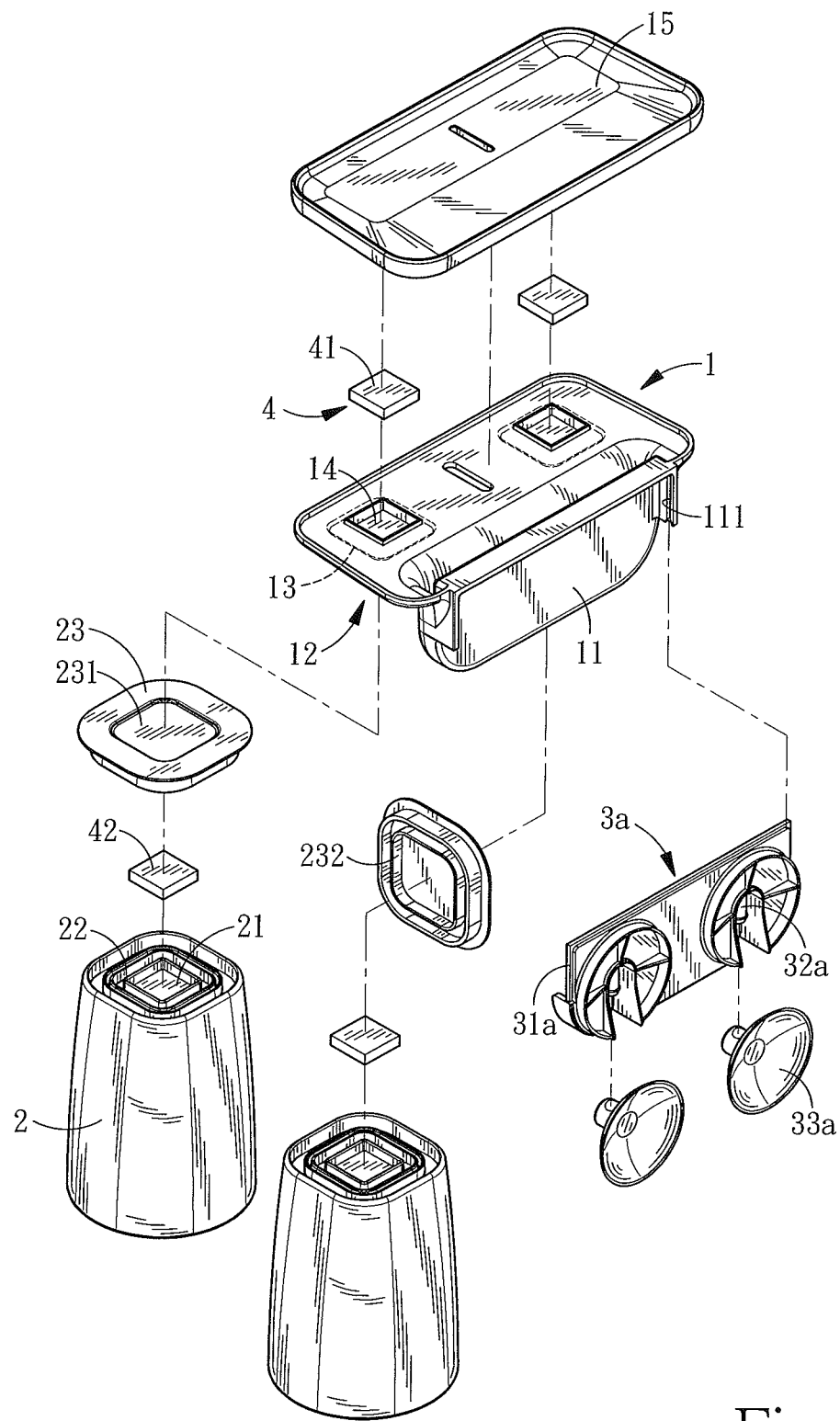
FIG. 4 is an exploded view of a structure in accordance with a second embodiment of the present invention.
Figure 5:
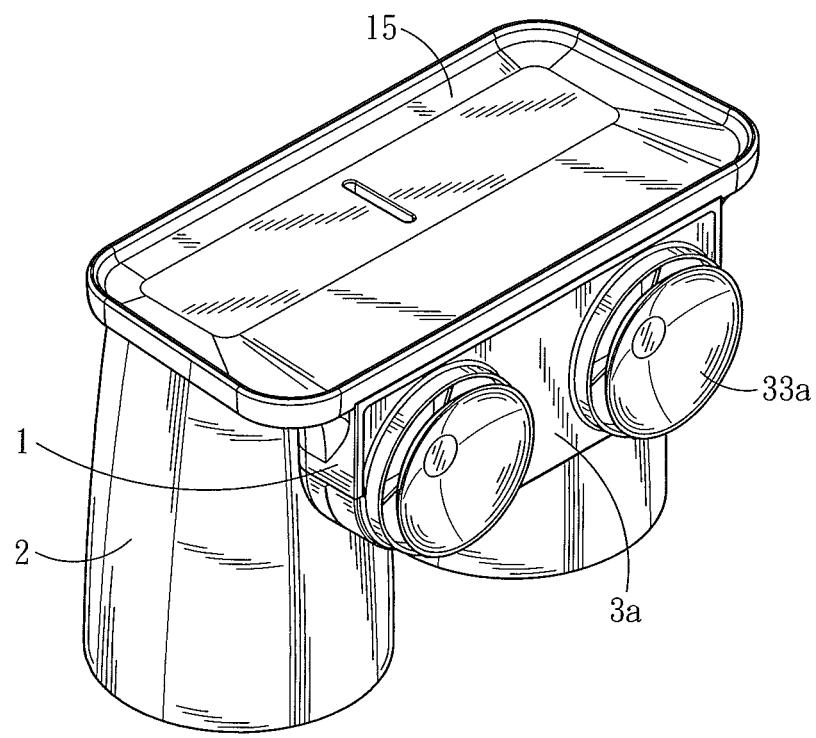
FIG. 5 is a schematic diagram illustrating the overall assembly of the structure in accordance with the second embodiment of the present invention.
Figure 6:
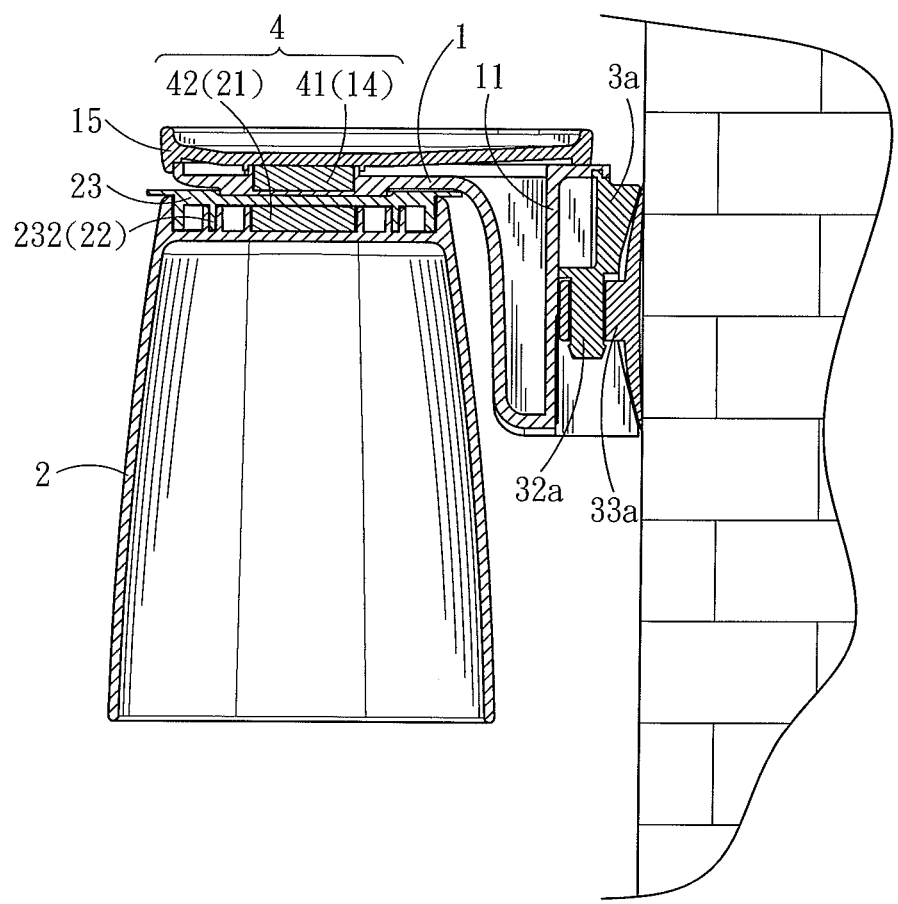
FIG. 6 is a cross-section view of the overall assembly of the structure in accordance with the second embodiment of the present invention.

Referring to FIGS. 4 to 6, a structure in accordance with a second embodiment of the present invention essentially includes: a securing element 3a and the holder 1, the container bodies 2 and the coupling sets 4 that are same with those described with reference to the first embodiment; wherein the holder 1, the container bodies 2 and the coupling sets 4 are assembled similar to those described with reference to the first embodiment, the only difference is in that the securing element 3a is provided with side protrusions 31a on both sides thereof for sliding into the respective guiding grooves 111, such that the securing element 3a can be combined with the bent portion 11. A plurality of securing portions 32a are provided on a side surface of the securing element 3a away from the holder 1. The securing portions 32a can be secured in place on an intended vertical face (e.g. a wall or other types of plane for securing) via at least one attachment element 33a. In this embodiment, the attachment element 33a is a sucker, and the securing portion 32a is a sucker base for fastening the sucker thereon. The securing element 3a and the holder 1 can be firmly fixed on the intended vertical face via the sucker(s).

From the above, it is clear that the multiple water containers and holder structure of the present invention allows easy storage and enhances application versatility, and it thus submitted to be novel and non-obvious and a patent application is hereby filed in accordance with the patent law. It should be noted that the descriptions given above are merely descriptions of preferred embodiments of the present invention, various changes, modifications, variations or equivalents can be made to the invention without departing from the scope or spirit of the invention. It is intended that all such changes, modifications and variations fall within the scope of the following appended claims and their equivalents.

What is claimed is:

1. A multiple water containers and holder structure, comprising:
    a holder including a bent portion at one side thereof to form an open receiving space between the holder and the bent portion and a plurality of receiving recesses on a side of the holder away from the receiving space;
    a securing element combined on the bent portion including at least one attachment element on a side surface of the securing element away from the holder for attaching the securing element onto an intended vertical face;
    a plurality of container bodies, each including a receiving recess on its bottom; and
    a plurality of coupling sets consisting of a plurality of first coupling elements provided in the receiving recesses of the holder and a plurality of second coupling elements provided in the receiving recesses on the bottoms of the container bodies, wherein the first coupling elements and the second coupling elements normally maintain connection with each other, so that the container bodies are stored and held in place in the receiving space of the holder;
    wherein:
    a plurality of combining portions are provided at one side of the holder closer to the receiving space corresponding to respective receiving recesses;
    a container bottom cover is mounted on each container body and covers the respective second coupling element;
    a combined portion is provided on each container bottom cover and is combined with a respective combining portion of the holder to combine each container bottom cover with the holder; and
    each combining portion is a convex portion, and each combined portion is a concave portion that fits the combining portion.

2. The multiple water containers and holder structure of claim 1, wherein the first and second coupling elements of the coupling sets are magnetic attracted bodies, each of the combining portions is located between the respective first coupling element and the respective container bottom cover, each container bottom cover is located between the respective combining portion and the respective second coupling element, and each of the second coupling elements is located between the respective container bottom cover and the respective container body.

3. The multiple water containers and holder structure of claim 1, wherein a concave slot is provided on the bottom of each of the container bodies, and each of the container bottom covers is provided with a rib which is inserted into the respective slot to combine the container bottom cover to the bottom of the respective container body.

4. The multiple water containers and holder structure of claim 1, wherein the attachment element is selected from one of a sucker and a double-sided adhesive tape.

5. The multiple water containers and holder structure of claim 1, wherein guiding grooves are provided on both sides of the bent portion of the holder, and side protrusions are provided on both sides of the securing element and slide into the respective guiding grooves.

* * * * *